United States Patent
Nishiura et al.

(10) Patent No.: US 11,266,078 B2
(45) Date of Patent: Mar. 8, 2022

(54) SEEDLING RAISING DEVICE, SUPPORTING DEVICE AND CELL PLUG FOR USE IN SEEDLING RAISING DEVICE

(71) Applicants: UNIVERSITY PUBLIC CORPORATION OSAKA, Osaka (JP); KUSAKABE KIKAI CO., LTD., Toyonaka (JP)

(72) Inventors: Yoshifumi Nishiura, Sakai (JP); Koji Shimada, Kusatsu (JP)

(73) Assignees: UNIVERSITY PUBLIC CORPORATION OSAKA; KUSAKABE KIKAI CO., LTD.

(*) Notice: Subject to any disclaimer, the term of this patent is extended or adjusted under 35 U.S.C. 154(b) by 196 days.

(21) Appl. No.: 16/330,137

(22) PCT Filed: Aug. 23, 2017

(86) PCT No.: PCT/JP2017/030163
§ 371 (c)(1),
(2) Date: Mar. 4, 2019

(87) PCT Pub. No.: WO2018/047625
PCT Pub. Date: Mar. 15, 2018

(65) Prior Publication Data
US 2019/0200540 A1 Jul. 4, 2019

(30) Foreign Application Priority Data
Sep. 6, 2016 (JP) .............................. JP2016-173444

(51) Int. Cl.
*A01G 9/029* (2018.01)
*A01G 27/06* (2006.01)
*A01G 9/02* (2018.01)

(52) U.S. Cl.
CPC ........... *A01G 9/0295* (2018.02); *A01G 9/028* (2013.01); *A01G 9/0293* (2018.02);
(Continued)

(58) Field of Classification Search
CPC .. A01G 9/0295; A01G 9/0293; A01G 9/0297; A01G 9/028; A01G 9/027; A01G 27/06
(Continued)

(56) References Cited

U.S. PATENT DOCUMENTS 3,760,966 A * 9/1973 Jones, Jr .................. B66F 9/18
414/785
4,213,274 A * 7/1980 Skaife .................... A01G 9/028
47/81

(Continued)

FOREIGN PATENT DOCUMENTS

DE 202010013543 U1 * 1/2012 ............ A01G 9/143
JP 36-7747 Y1 4/1961
(Continued)

OTHER PUBLICATIONS

International Preliminary Report on Patentability and English translation of the Written Opinion of the International Searching Authority, dated Mar. 21, 2019, for International Application No. PCT/JP2017/030163.
(Continued)

*Primary Examiner* — Brady W Frazier
*Assistant Examiner* — Zoe Tam Tran
(74) *Attorney, Agent, or Firm* — Birch, Stewart, Kolasch & Birch, LLP

(57) ABSTRACT

A seedling raising device includes: a cell plug for seedling raising that is formed as a single pot body; and a supporting device configured to detachably arrange and support a plurality of cell plugs, wherein the supporting device is capable of supporting the cell plug in either one of a first
(Continued)

supporting position where the cell plug is slidably supported in a horizontal direction and a second supporting position where the cell plug is detachably supported in a top position.

6 Claims, 13 Drawing Sheets

(52) U.S. Cl.
CPC ........... *A01G 9/0297* (2018.02); *A01G 27/06* (2013.01); *A01G 9/027* (2013.01)

(58) Field of Classification Search
USPC .............................. 9/29, 299; 248/298.1, 912
See application file for complete search history.

(56) References Cited

U.S. PATENT DOCUMENTS

| | | | | |
|---|---|---|---|---|
| 5,215,427 | A * | 6/1993 | Olsthoorn | A01G 9/088 414/623 |
| 5,664,370 | A * | 9/1997 | Boudreau | A01G 9/0295 47/87 |
| 6,415,549 | B1 * | 7/2002 | Beeson, Jr | A01G 9/0295 47/84 |
| 7,020,997 | B1 * | 4/2006 | Thomas | A01G 9/028 47/39 |
| 8,763,820 | B2 * | 7/2014 | Hanley | A47B 81/00 211/88.01 |
| 2002/0033003 | A1 * | 3/2002 | Weder | B65D 19/44 53/447 |
| 2006/0218862 | A1 * | 10/2006 | Dyas | A01G 9/0295 47/86 |
| 2008/0086942 | A1 * | 4/2008 | Maier | A01G 9/027 47/65.5 |
| 2009/0119987 | A1 * | 5/2009 | Ingrassia | A01G 9/0295 47/66.5 |
| 2010/0033926 | A1 * | 2/2010 | Du | H05K 7/1489 361/679.58 |

FOREIGN PATENT DOCUMENTS

| | | | |
|---|---|---|---|
| JP | 4-41818 Y2 | 10/1992 | |
| JP | 2517105 Y2 | 11/1996 | |
| JP | 8-317732 A | 12/1996 | |
| JP | 10-225235 A | 8/1998 | |
| JP | 3796627 B2 | 7/2006 | |
| JP | 2008-154564 A | 7/2008 | |
| WO | WO-2012034575 A1 * | 3/2012 | ............. A01G 31/02 |

OTHER PUBLICATIONS

International Search Report, issued in PCT/JP2017/030163, PCT/ISA/210, dated Nov. 21, 2017.

* cited by examiner

SEEDLING RAISING DEVICE, SUPPORTING DEVICE AND CELL PLUG FOR USE IN SEEDLING RAISING DEVICE

CROSS REFERENCE TO RELATED APPLICATIONS

This application is the National Phase of PCT/JP2017/030163 filed on Aug. 23, 2017, which claims priority under 35 U.S.C. § 119(a) to Patent Application No. 2016-173444 filed in Japan on Sep. 6, 2016, all of which are hereby expressly incorporated by reference into the present application.

TECHNICAL FIELD

The present invention relates to a seedling raising device, and a supporting device and a cell plug for use in the seedling raising device.

BACKGROUND ART

Conventionally, a cell tray for seedling raising is configured by connecting cell plugs for seedling raising in an inseparable manner, each plug having a specified shape, as disclosed in JP 10-225235 A.

DISCLOSURE OF THE INVENTION

Problems to be Solved by the Invention

Therefore, when classifying or sorting raised seedlings, there is a problem that a seedling is required to be pulled out of a cell plug for raising seedling, but this operation is complicated.

Accordingly, it is an object of the present invention to provide a seedling raising device, and a supporting device and a cell plug for use in the seedling raising device, which can facilitate the collection of cell plugs so as to raise and deliver seedlings and the separation of the cell plugs so as to classify and sort seedlings.

Means for Solving the Problems

The first invention of the present application is characterized by a seedling raising device comprising:

a cell plug for seedling raising that is formed as a single pot body; and a supporting device configured to detachably arrange and support a plurality of cell plugs, wherein the supporting device is capable of supporting the cell plug in either one of a first supporting position where the cell plug is slidably supported in a horizontal direction and a second supporting position where the cell plug is detachably supported in a top position.

With the above-mentioned configuration, the seedling raising device includes the supporting device for detachably arranging and supporting the cell plugs. Thus, when raising and delivering seedlings, the cell plugs are supported by the supporting device. Furthermore, when classifying and sorting raised seedlings, the cell plugs are detached from the supporting device. Therefore, these operations can be easily performed. Moreover, the supporting device is capable of supporting the cell plug in either one of the first supporting position and the second supporting position, so that the supporting position of the cell plug can be changed depending on the handling state of the cell plug. Specifically, the cell plugs can be supported in the first supporting position when the cell plugs are supported while being prevented from being detached from the supporting device, such as when the cell plugs are transported. On the other hand, the cell plugs can be supported in the second supporting position when the cell plugs are supported while being easily detachable, such as when any defective seedling is selectively removed.

The above-mentioned first invention preferably further includes the following configurations.

(1) The supporting device is configured to support the cell plug in either one of the first supporting position and the second supporting position in such a manner as to flexibly set an interval between the cell plugs.

(2) In the above-mentioned configuration (1), the supporting device includes a first member and a second member that face each other and is configured to be capable of changing an interval between the first member and the second member, the first member is provided with a first engaging portion extending in the horizontal direction, the second member is provided with a second engaging portion facing the first engaging portion and extending in the horizontal direction, the cell plug is slidable in the horizontal direction while being engaged with the first engaging portion and the second engaging portion, the first member is provided with a first mounting portion extending in the horizontal direction, the second member is provided with a second mounting portion facing the first mounting portion and extending in the horizontal direction, and the cell plug is mounted on the first mounting portion and the second mounting portion and is detachable in the top position.

(3) In the above-mentioned configuration (2), a first concave portion recessed downward and extending in the horizontal direction is provided on an upper end of the first member, a second concave portion recessed downward and extending in the horizontal direction is provided on an upper end of the second member, the first concave portion and the second concave portion are capable of storing therein a liquid, and the seedling raising device further comprises a liquid supply member capable of supplying the liquid stored in the first concave portion or the second concave portion into the cell plug.

(4) In the above-mentioned configuration (3), the first concave portion and the second concave portion are exposed to atmosphere, and the liquid supply member is made of a lubricating medium and is configured to supply the liquid stored in the first concave portion or the second concave portion into the cell plug using a capillary phenomenon.

(5) In any one of the above-mentioned configurations (2) to (4), the cell plug comprises a portion to be engaged that is engageable with the first engaging portion and the second engaging portion, and a portion to be mounted that is mountable on the first mounting portion and the second mounting portion, and the portion to be engaged and the portion to be mounted are configured to protrude laterally outward from a main body of the cell plug.

(6) The cell plug has a through hole formed in a bottom wall thereof.

With the above-mentioned configuration (1), the supporting device can flexibly set the interval between the adjacent cell plugs, thereby making it possible to adjust the number of the cell plugs arranged in rows and the ventilation of air between the cell plugs, and also to rearrange the cell plugs so as to align the growth of the seedlings.

With the above-mentioned configuration (2), the supporting device can change the interval between the first member and the second member and thereby can support the cell plugs having different dimensions. The above-mentioned configuration (2) is the specific configuration of the cell plug and the supporting device for supporting the cell plugs in either one of the first supporting position and the second supporting position. According to this configuration, the supporting device can support the cell plugs in any one of a plurality of positions with the simple structure.

With the above-mentioned configuration (3), since the liquid stored in the first concave portion and the second concave portion is supplied to the culture soil in the cell plug by the liquid supply member, the liquid can be effectively supplied, compared to the supply by sprinkling water from above.

With the above-mentioned configuration (4), the liquid, which is retained in an open circuit, is supplied using the capillary phenomenon. This configuration can provide an inexpensive, easy-to-use irrigation facility having flexibility and which facilitates the adjustment of the amount of irrigated liquid when a small amount of liquid is supplied.

With the above-mentioned configuration (5), the portion to be engaged and the portion to be mounted, supported by the supporting device, can be easily configured.

With the above-mentioned configuration (6), the drainage of water and ventilation of air through the culture soil in the cell plug can be effectively performed by the through hole located in the bottom wall.

The second invention of the present application is characterized by a supporting device configured to detachably support a cell plug for seedling raising, the cell plug being formed as a single pot body, the supporting device comprising a first member and a second member that face each other, the supporting device being configured to be capable of changing an interval between the first member and the second member, wherein the first member is provided with a first engaging portion extending in a horizontal direction, the second member is provided with a second engaging portion facing the first engaging portion and extending in the horizontal direction, the first member is further provided with a first mounting portion extending in the horizontal direction, and the second member is further provided with a second mounting portion facing the first mounting portion and extending in the horizontal direction.

With the above-mentioned configuration, the supporting device capable of supporting the cell plug in either one of two positions can be provided.

The third invention of the present application is characterized by a cell plug for seedling raising that is formed as a single pot body, the cell plug comprising:

a main body; a portion to be engaged that protrudes laterally outward from the main body, the portion to be engaged being configured to be engaged with a supporting device for supporting the cell plug; and a portion to be mounted that protrudes laterally outward from the main body, the portion to be mounted being configured to be mounted on the supporting device, wherein a through hole is formed in the bottom wall of the main body.

With the above-mentioned configuration, the cell plug can be provided which is supported by the supporting device and enables the drainage of water and ventilation of air from the culture soil in the cell plug itself.

The above-mentioned third invention preferably further includes the following configuration.

(7) The cell plug further comprises a partition member partitioning the inside of the cell plug and a supporting member supporting the partition member.

With the above-mentioned configuration (7), the cell plug capable of adjusting the amount of culture soil in the cell plug can be provided.

Effects of the Invention

In short, according to the present invention, there is provided a seedling raising device, and a supporting device and a cell plug for use in the seedling raising device, which can facilitate the collection of cell plugs so as to raise and deliver seedlings and the separation of the cell plugs so as to classify and sort seedlings.

MODE FOR CARRYING OUT THE INVENTION (Overall Configuration)

Figure 1:
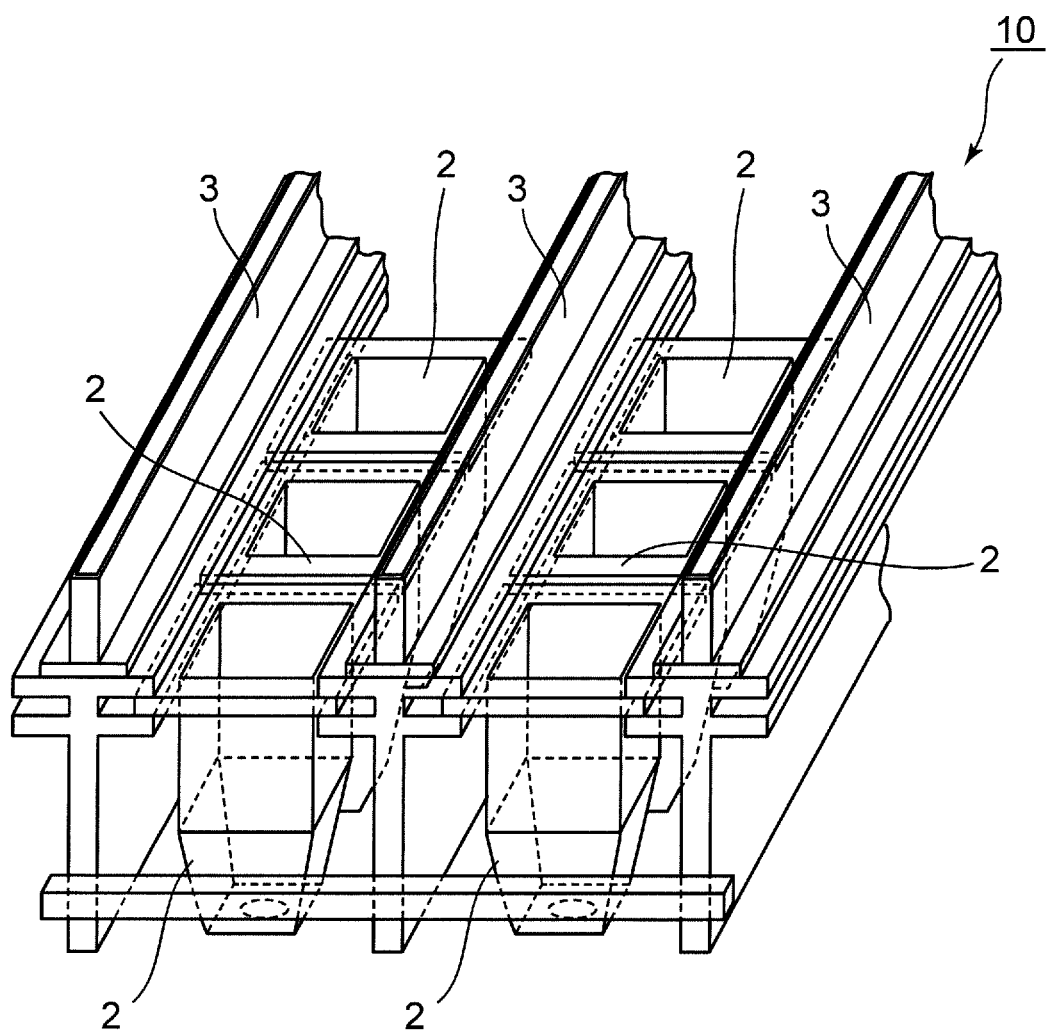
FIG. 1 is a schematic perspective view of a seedling raising device according to an embodiment of the present invention.

FIG. 1 is a schematic perspective view of a seedling raising device 10 according to an embodiment of the present invention. As shown in FIG. 1, the seedling raising device 10 includes a cell plug 2 for seedling raising that is formed as a single pot body, and a supporting device 3 configured to detachably arrange and support the plurality of cell plugs 2.

Figure 2:
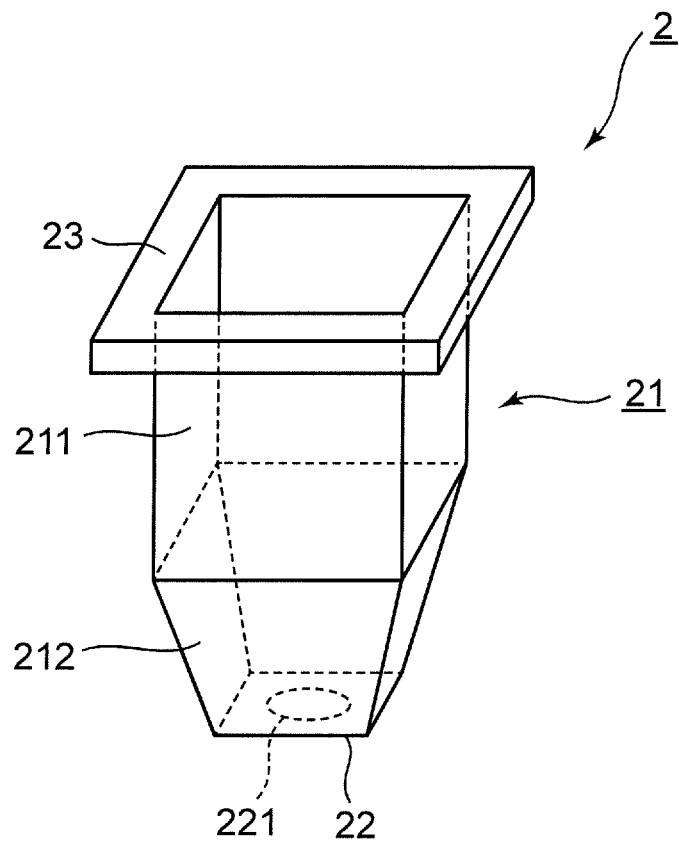
FIG. 2 is a schematic perspective view of a cell plug.

FIG. 2 is a schematic perspective view of the cell plug 2. As shown in FIG. 2, the cell plug 2 includes a side wall 21 and a bottom wall 22. An upper end of the side wall 21 is an open edge, and the bottom wall 22 is continuous to a lower end of the side wall 21. The side wall 21 and the bottom wall 22 are integrally formed. The side wall 21 includes an upper portion 211 and a lower portion 212. The horizontal cross-sectional shape of the upper portion 211 is constant along the vertical direction. Meanwhile, the horizontal cross-section of the lower portion 212 becomes smaller along the downward direction. That is, the lower portion 212 has a tapered shape that decreases in size downward.

Figure 3:
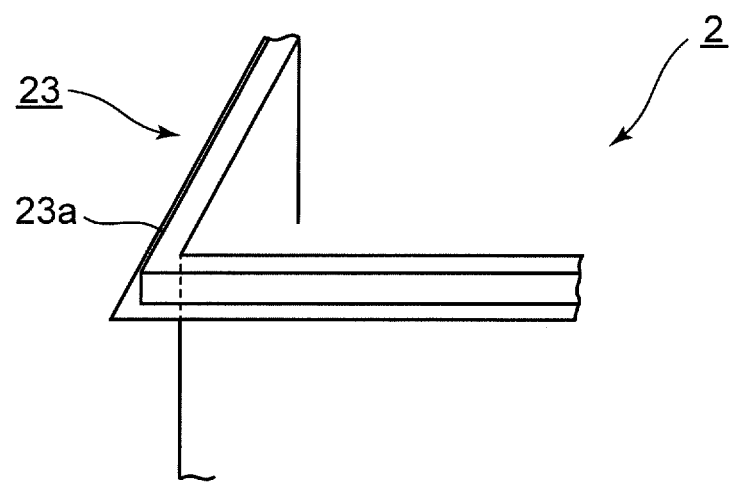
FIG. 3 is an enlarged perspective view of a portion to be engaged.

A rectangular portion to be engaged 23 that protrudes laterally outward from the side wall 21 is formed on an upper end of the side wall 21. FIG. 3 is an enlarged perspective view of the portion to be engaged 23. As shown in FIG. 3, the portion to be engaged 23 is engageable with a first engaging portion and a second engaging portion of the supporting device 3 to be mentioned later. The portion to be engaged 23 is mountable as a portion to be mounted, on a first mounting portion and a second mounting portion of the supporting device 3. The side wall 21 and the portion to be engaged 23 are integrally formed. An outer end 23a of the portion to be engaged 23 has a stepped shape that has its lower part protruding outward, compared to its upper part. The portion to be engaged 23 is preferably formed such that its bottom part is deformed to be recessed upward so as to easily lift the cell plug 2 by a robot arm.

The bottom wall 22 has a through hole 221 penetrating therethrough in the vertical direction. The through hole 221 has a circular shape and enables the drainage of water and ventilation of air through the culture soil in the cell plug 2.

The cell plug 2 is made of plastic, such as polypropylene or vinyl.

Figure 4:
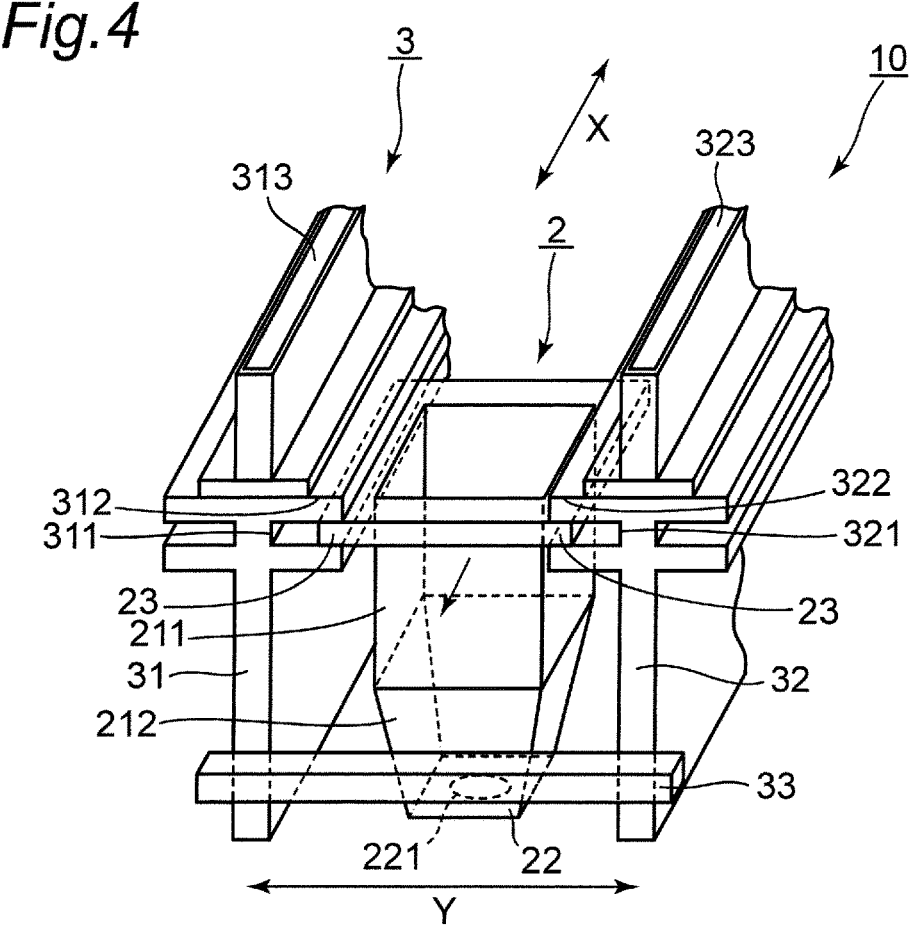
FIG. 4 is an enlarged perspective view of the seedling raising device shown in FIG. 1.
Figure 5:
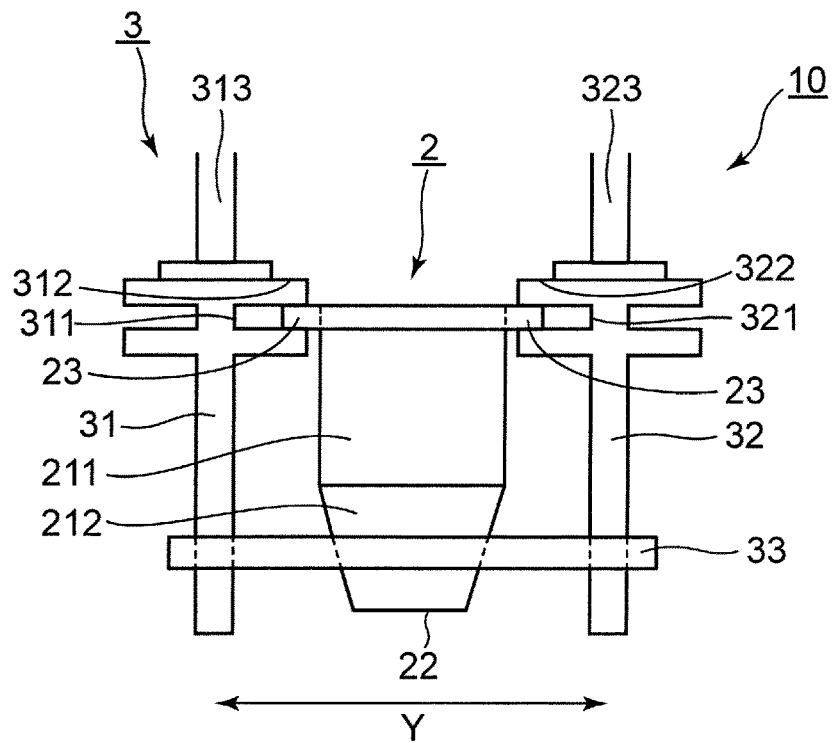
FIG. 5 is a front view of the seedling raising device shown in FIG. 4.

FIG. 4 is an enlarged perspective view of the seedling raising device 10 shown in FIG. 1, and FIG. 5 is a front view of the seedling raising device shown in FIG. 4. As shown in FIGS. 4 and 5, the supporting device 3 is configured to arrange and support the cell plugs 2 in one of the horizontal directions (X direction). The supporting device 3 includes a first member 31 and a second member 32 that support the cell plug 2 while sandwiching the cell plug 2 therebetween. The first member 31 and the second member 32 face each other in a direction (Y direction) orthogonal to the X direction.

The supporting device 3 includes a connection member 33 that connects the first member 31 and the second member 32 so as to be capable of changing an interval in the Y direction between the first member 31 and the second member 32. The connection member 33 is provided to extend in the Y direction, and is capable of connecting a plurality of sets of the first and second members 31 and 32. Consequently, the supporting device 3 is capable of arranging and supporting the cell plugs 2 in the X direction and the Y direction. The connection member 33 has a plurality of supporting positions of the first member 31 and the second member 32, and may change the interval in the Y direction between the first member 31 and the second member 32 by changing or adjusting the supporting positions of the first member 31 and the second member 32.

The first member 31 is provided with a first engaging portion 311 extending in the X direction. The second member is provided with a second engaging portion 321 facing the first engaging portion 311 and extending in the X direction. The cell plug 2 is slidable in the X direction while being engaged with the first engaging portion 311 and the second engaging portion 321.

(Engagement State (First Supporting Position) of the Cell Plug 2 with the First Engaging Portion 311 and the Second Engaging Portion 321)

The first engaging portion 311 is a groove portion extending in the X direction, and the second engaging portion 321 is a groove portion extending in the X direction. The supporting device 3 supports the cell plug 2 by engaging the portion to be engaged 23 of the cell plug 2 with the groove portion of the first engaging portion 311 and the groove portion of the second engaging portion 321. Therefore, the cell plug 2 is slidable in the X direction in a state of being engaged with the first engaging portion 311 and the second engaging portion 321, so that the cell plug 2 can be detached from the supporting device 3 by sliding outward in the X direction from the ends in the X direction of the first engaging portion 311 and the second engaging portion 321. It is noted that the cell plug 2 is supported in the first supporting position in a state where a space is formed below the bottom wall of the cell plug 2. In the first supporting position, the cell plugs 2 are configured such that the interval in the X direction between the cell plugs 2 can be flexibly set. The portion to be engaged 23 of the cell plug 2 has a rectangular shape, whereby the cell plug 2 in the X direction can be easily slid, compared to the case where the portion to be engaged has a circular shape.

Figure 6:
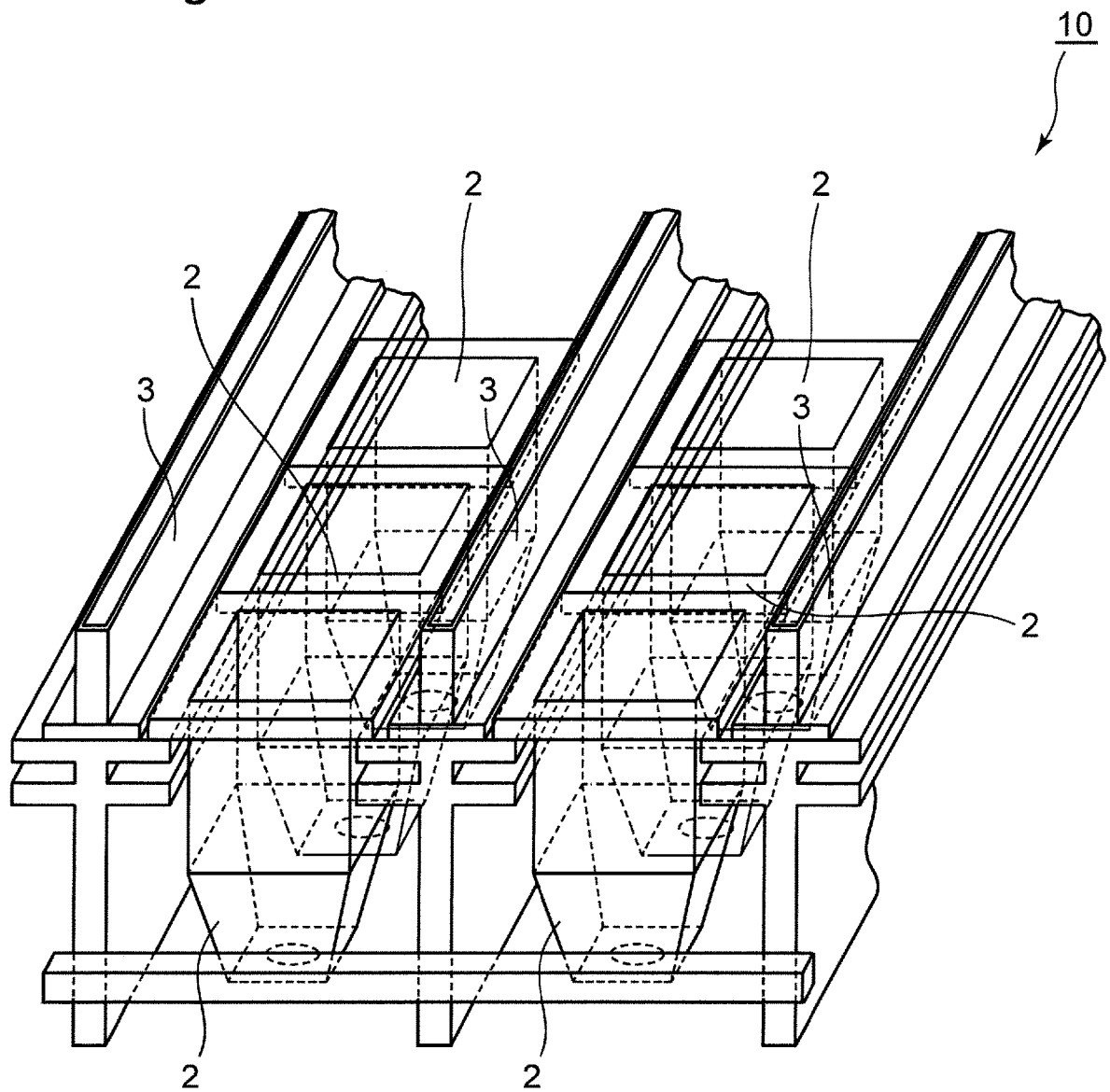
FIG. 6 is a schematic perspective view of a seedling raising device 10, showing a state in which the cell plugs are mounted on a first mounting portion and a second mounting portion.
Figure 7:
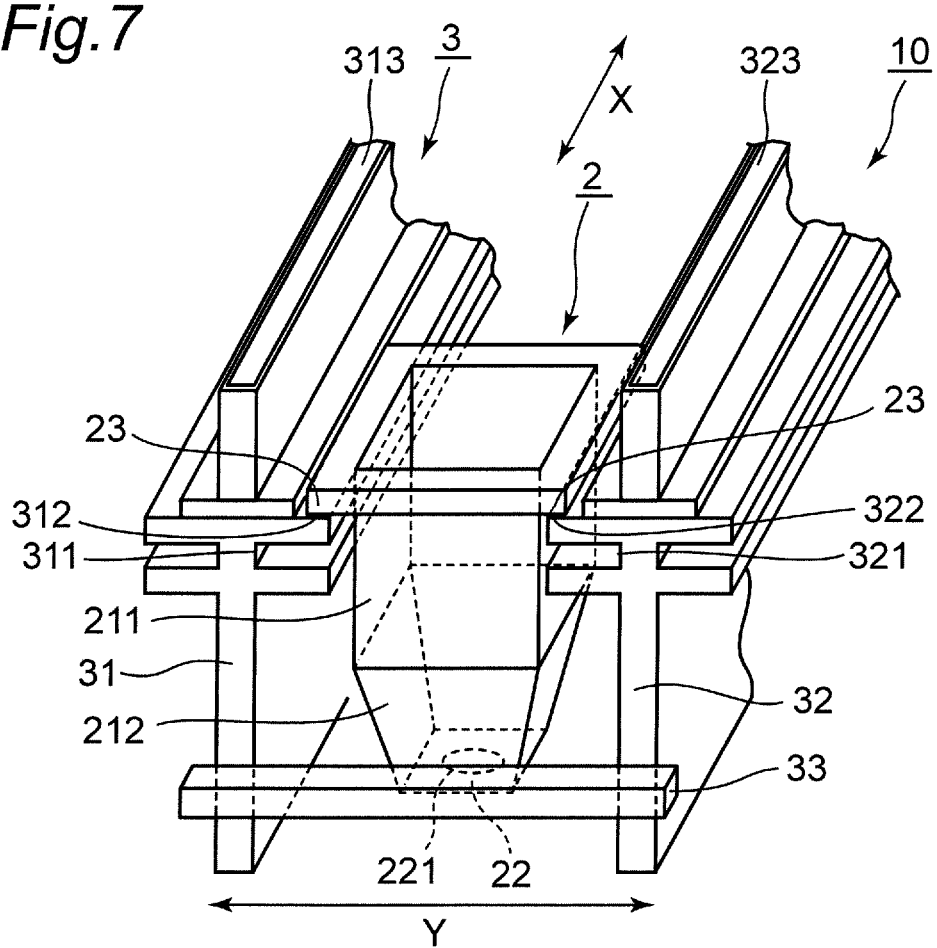
FIG. 7 is an enlarged perspective view of the seedling raising device 10 shown in FIG. 6.
Figure 8:
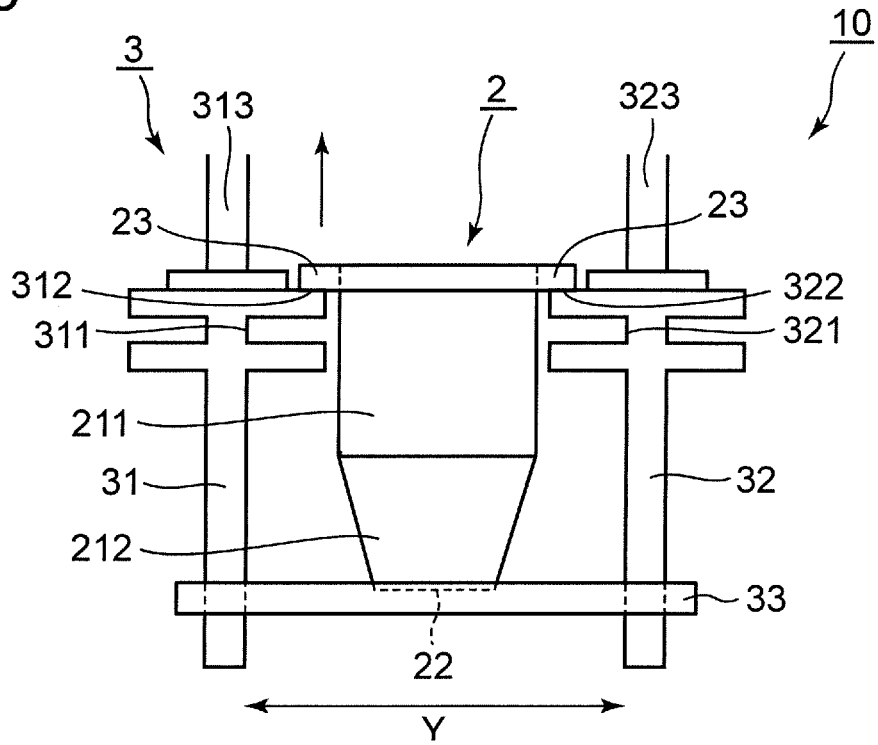
FIG. 8 is a front view of the seedling raising device shown in FIG. 7.

The first member 31 is provided with a first mounting portion 312 protruding outward in the Y direction and extending in the X direction. The second member 32 is provided with a second mounting portion 322 facing the first mounting portion 312, protruding outward in the Y direction, and extending in the X direction. FIG. 6 is a schematic perspective view of the seedling raising device 10, showing a state in which the cell plugs 2 are mounted on a first mounting portion 312 and a second mounting portion 322, FIG. 7 is an enlarged perspective view of the seedling raising device 10 shown in FIG. 6, and FIG. 8 is a front view of the seedling raising device shown in FIG. 7. As shown in FIGS. 6 to 8, the cell plug 2 is mounted on the first mounting portion 312 and the second mounting portion 322 and is detachable in the top position.
(Mounted State (Second Supporting Position) of the Cell Plug 2 on the First Mounting Portion 312 and the Second Mounting Portion 322)

The first mounting portion 312 is a protrusion extending in the X direction, and the second mounting portion 322 is a protrusion extending in the X direction. The supporting device 3 supports the cell plug 2 by mounting the portion to be engaged 23 as a portion of the cell plug 2 to be mounted, on the first mounting portion 312 and the second mounting portion 322. Therefore, the cell plug 2 is lifted upward from the supporting device 3, and thereby is separated from the first mounting portion 312 and the second mounting portion 322 and then detached from the supporting device 3. It is noted that the cell plug 2 is supported in the second supporting position in a state where a space is formed below the bottom wall of the cell plug 2. In the second supporting position, the cell plugs are configured such that the interval in the X direction between the cell plugs 2 can be flexibly set.

Figure 9:
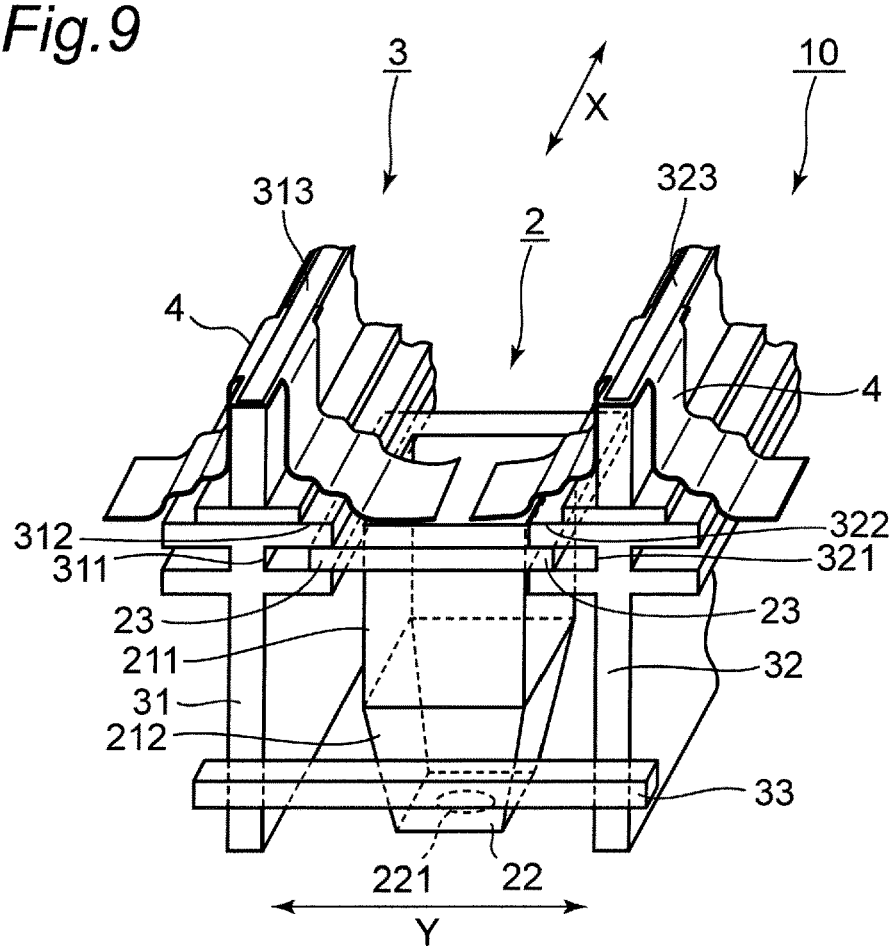
FIG. 9 is a schematic perspective view of a seedling raising device in which liquid supply members are respectively provided in a first concave portion and a second concave portion in a state where the cell plug is engaged with a first engaging portion and a second engaging portion.
Figure 10:
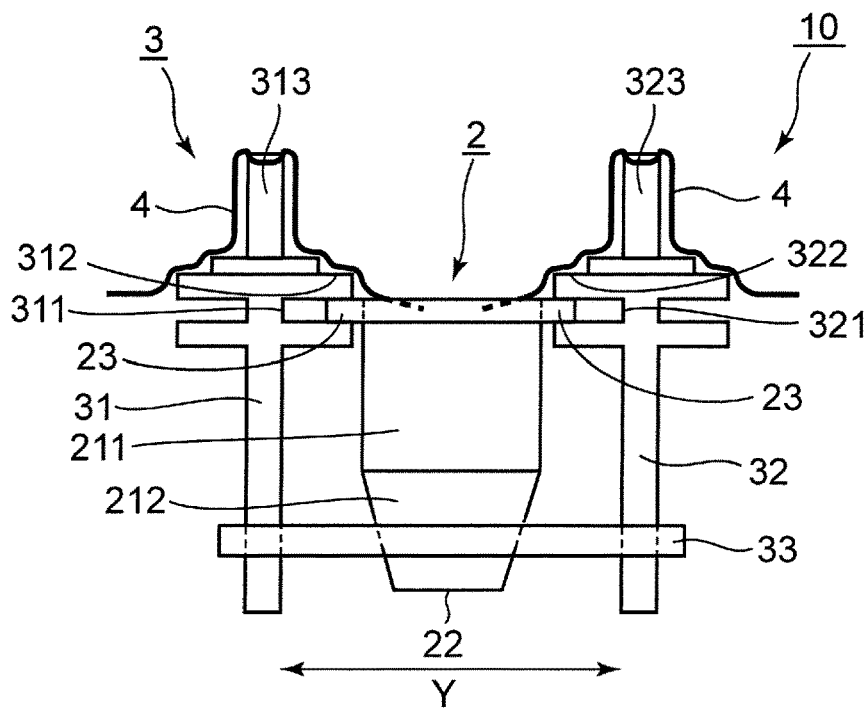
FIG. 10 is a front view of the seedling raising device shown in FIG. 9.
Figure 11:
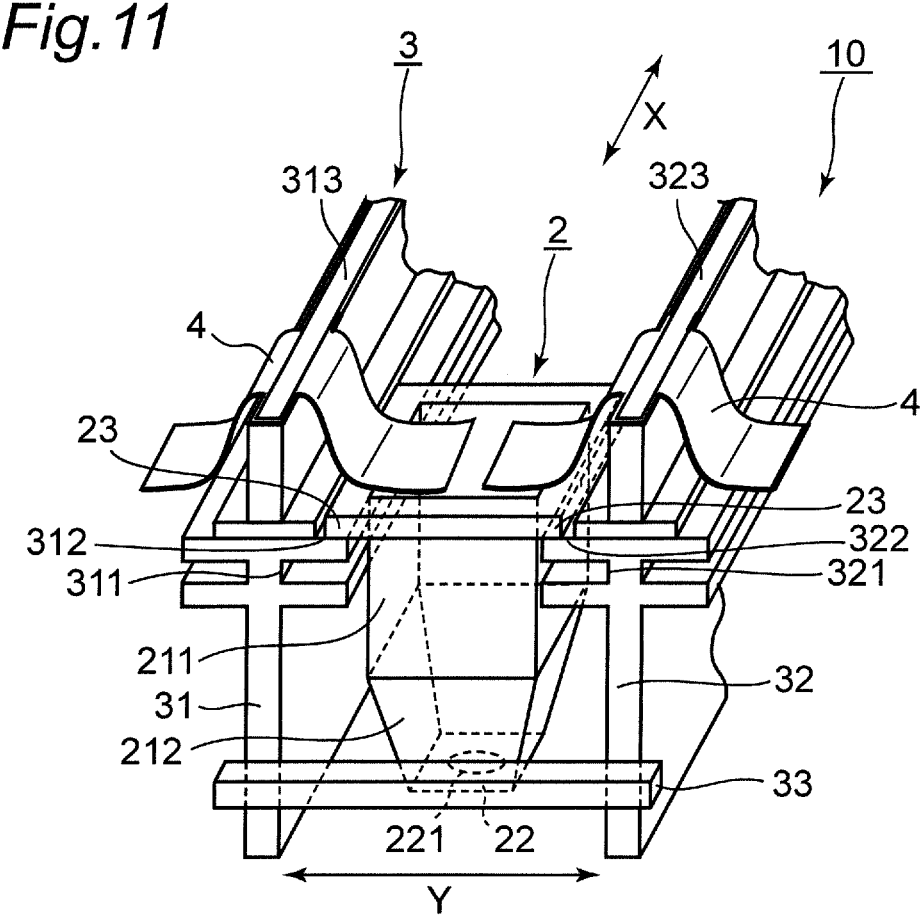
FIG. 11 is a schematic perspective view of a seedling raising device in which liquid supply members are respectively provided in the first concave portion and the second concave portion in a state where the cell plug is mounted on the first mounting portion and the second mounting portion.
Figure 12:
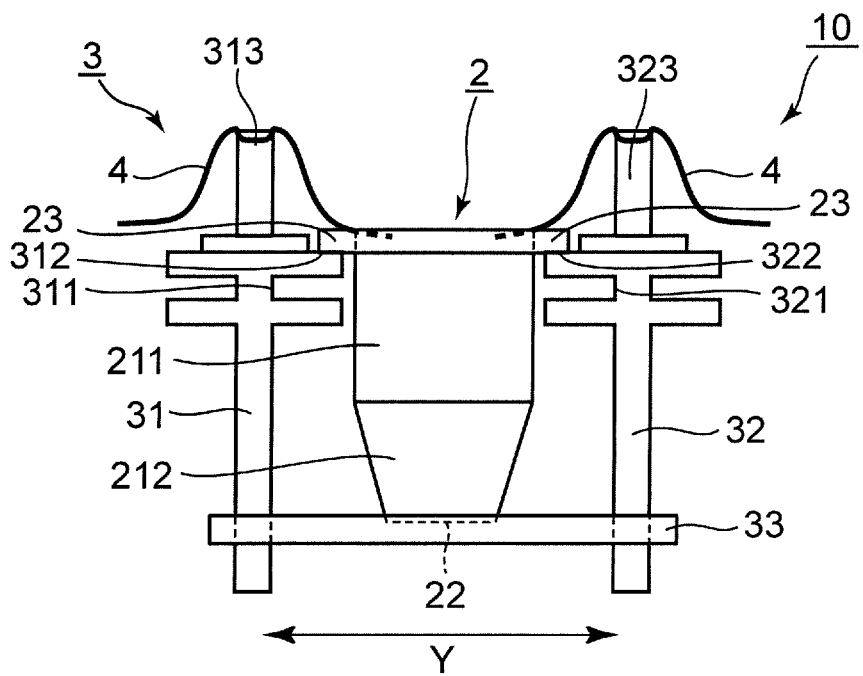
FIG. 12 is a front view of the seedling raising device shown in FIG. 11.

A first concave portion 313 recessed downward and extending in the horizontal direction is formed on an upper end of the first member 31. A second concave portion 323 recessed downward and extending in the horizontal direction is formed on an upper end of the second member 32. The first concave portion 313 and the second concave portion 323 are capable of storing therein a liquid and are exposed to the atmosphere. A liquid supply member 4 is provided in each of the first concave portion 313 and the second concave portion 323. The liquid supply member 4 is capable of supplying the liquid stored in the first concave portion 313 or the second concave portion 323 to the culture soil in the cell plug 2. FIG. 9 is a schematic perspective view of the seedling raising device 10 in which the liquid supply member 4 is provided in each of the first concave portion 313 and the second concave portion 323 in a state where the cell plug 2 is engaged with the first engaging portion 311 and the second engaging portion 321. FIG. 10 is a front view of the seedling raising device shown in FIG. 9. FIG. 11 is a schematic perspective view of the seedling raising device 10 in which the liquid supply member 4 is provided in each of the first concave portion 313 and the second concave portion 323 in a state where the cell plug 2 is mounted on the first mounting portion 312 and the second mounting portion 322. FIG. 12 is a front view of the seedling raising device shown in FIG. 11.

As shown in FIGS. 9 to 12, the liquid supply member 4 is made of a lubricating medium. The liquid supply member 4 is made of, for example, a nonwoven fabric. One end of the liquid supply member 4 is immersed in the liquid, for example, water stored in the first concave portion 313 or the second concave portion 323. The other end of the liquid supply member 4 protrudes from the portion to be engaged 23 of the cell plug 2 into the cell plug 2 to be in contact with the culture soil in the cell plug 2 or to drip the liquid onto the culture soil in the cell plug 2. The liquid supply member 4 supplies the liquid stored in the first concave portion 313 or the second concave portion 323 to the culture soil in the cell plug 2 on the principle of siphon using the capillary phenomenon. Therefore, the first concave portion 313 and the second concave portion 323 are positioned above the upper surface of the culture soil in the cell plug 2.

According to the seedling raising device 10 with the above-mentioned configuration, the following effects can be exhibited.

(1) The seedling raising device 10 includes the supporting device 3 for detachably arranging and supporting the cell plugs 2, each being formed as a single pot body. Thus, when raising and delivering seedlings, the cell plugs 2 are supported by the supporting device 3. Furthermore, when classifying and sorting raised seedlings, the cell plug is detached from a supporting device 3. Therefore, these operations can be easily performed.

(2) The supporting device 3 is capable of supporting the cell plugs 2 in either one of the first supporting position where the cell plug 2 is slidably supported in the horizontal direction and the second supporting position where the cell plug 2 is detachably supported in the top position. Consequently, the supporting position of the cell plug 2 can be changed depending on the handling state of the cell plug 2. Specifically, the cell plugs 2 can be supported in the first supporting position when the cell plugs 2 are supported while being prevented from being detached from the supporting device 3, such as when the cell plugs 2 are transported. In contrast, the cell plugs 2 can be supported in the second supporting position when the cell plugs 2 are supported while being easily detachable, such as when any defective seedling is selectively removed.

(3) The supporting device 3 is capable of flexibly setting the interval between the cell plugs 2 in either one of the first supporting position and the second supporting position, thereby making it possible to adjust the number of the cell plugs 2 arranged in rows and the ventilation between the cell plugs 2, and also to rearrange the cell plugs 2 so as to align the growth of the seedlings. In this way, the supporting device 3 can flexibly change the interval between and the number of the cell plugs 2 in the direction (X direction) in which the cell plugs are arranged.

(4) The supporting device 3 is capable of changing the interval between the first member 31 and the second member 32, and thereby can support the cell plugs having different dimensions.

(5) The first member 31 is provided with a first engaging portion 311 extending in the X direction; the second member 32 is provided with the second engaging portion 321 facing the first engaging portion 311 and extending in the X direction; and the cell plug 2 is configured to be engaged with the first engaging portion 311 and the second engaging portion 321 and to be slidable in the X direction. Thus, the supporting device 3 can have the first supporting position set therein to slidably support the cell plug 2 in the X direction with a simple structure. When a frame is provided to cover and fix the cell plugs 2 from above in order to prevent the cell plugs 2 from coming out of the supporting member 3, the frame could damage the seedlings in the cell plugs 2. On the other hand, in the present embodiment, the cell plug 2 is supported by being engaged with the first engaging portion 311 and the second engaging portion 321 of the supporting member 3, thereby making it possible to prevent the seedlings in the cell plug 2 from being pinched and damaged by the first engaging portion 311 and the second engaging portion 321 of the supporting member 3 and the like.

(6) The first member 31 is provided with the first mounting portion 312 extending in the X direction; the second member 32 is provided with a second mounting portion 322 facing the first mounting portion 312 and extending in the X direction, and the cell plug 2 is configured to be mounted on the first mounting portion 312 and the second mounting portion 322 and to be detachable in the upper direction. Thus, the supporting device 3 can have the second supporting position set therein to detachably support the cell plug 2 in the upper direction with a simple structure.

(7) The first concave portion 313 and the second concave portion 323 are capable of storing therein the liquid. The seedling raising device 10 includes the liquid supply member 4 capable of supplying the liquid stored in the first concave portion 313 or the second concave portion 323 to the culture soil in the cell plug 2. Therefore, since the liquid stored in the first concave portion 313 and the second concave portion 323 is supplied to the culture soil in the cell plug 2 by the liquid supply member 4, the liquid can be effectively supplied, compared to the supply by sprinkling water from above.

(8) The first concave portion 313 and the second concave portion 323 have the liquid in an open circuit, and the liquid supply member 4 supplies the liquid on the principle of siphon by using the capillary phenomenon. This configuration can provide an inexpensive, easy-to-use irrigation facility having flexibility and which facilitates the adjustment of the amount of irrigated liquid when a small amount of liquid is supplied. In contrast, when a closed circuit, such as a pipe or tube, is used to supply a liquid, an irrigation facility has problems, including the occurrence of a difference in flow rate of the liquid caused by a pressure loss or the like, poor flexibility in use as an irrigation system, mixing of air, and the occurrence of cavitation. Furthermore, in such a facility, the culture soil in the cell plug may flow out of the cell plug due to poor adjustment of the amount of irrigated liquid.

(9) The cell plug 2 includes the portion to be engaged 23 which is engageable with the first engaging portion 311 and the second engaging portion 321 and which is mountable on the first mounting portion 312 and the second mounting portion 322. The portion to be engaged 23 protrudes laterally outward from a main body of the cell plug 2. Therefore, the portion to be engaged 23 supported by the supporting device 3 can be easily configured.

(10) Since the cell plug 2 has the through hole 221 formed in the bottom wall 22, the drainage of water and ventilation of air through the culture soil in the cell plug 2 can be effectively performed.

(11) In either one of the first supporting position and the second supporting position, the cell plug 2 is supported with a space formed below the bottom wall 22 of the cell plug 2, thereby making it possible to promote the drainage of water and ventilation of air from the through hole 221 in the bottom wall 22 of the cell plug 2.

In the above embodiments, the through hole 221 formed in the bottom wall 22 of the cell plug 2 has a circular shape, but the shape of the through hole is not limited to the circular shape, and the through hole can take various shapes, such as an ellipse, a rectangle, and a slit. Alternatively, the through hole 221 may have a mesh shape composed of the collection of small through holes.

In the above-mentioned embodiments, the portion to be engaged 23 of the cell plug 2 which is engaged with the first engaging portion 311 and the second engaging portion 321 of the supporting device 3 is the same portion as the portion to be mounted of the cell plug 2 which is mounted on the first mounting portion 312 and the second mounting portion 322 of the supporting device 3. However, the portion to be engaged and the portion to be mounted may be formed separately.

In the above embodiments, the first engaging portion 311 and the first mounting portion 312 are formed in the first member 31, but may be attached to the first member 31. Similarly, the second engaging portion 321 and the second mounting portion 322 are formed in the second member 32, but may be attached to the second member 32.

Figure 13:
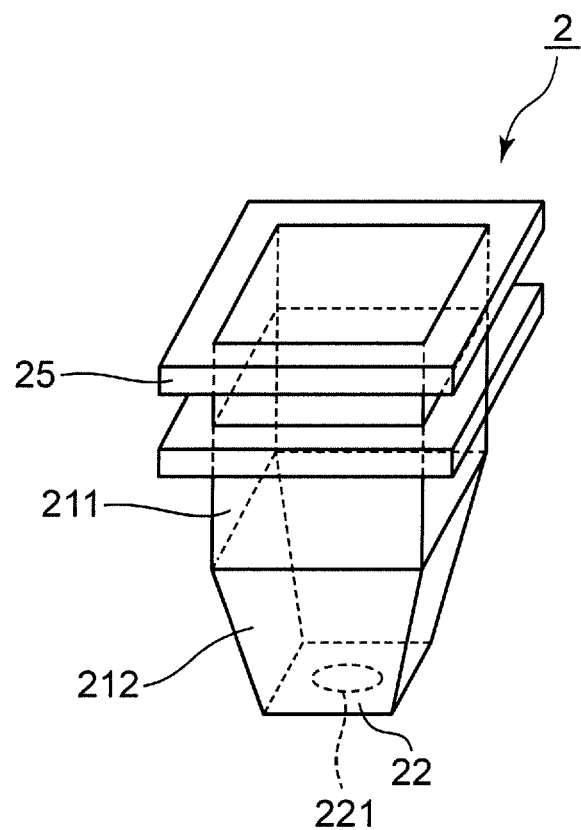
FIG. 13 is a schematic perspective view of a cell plug having a portion to be engaged, which has a groove shape.
Figure 14:
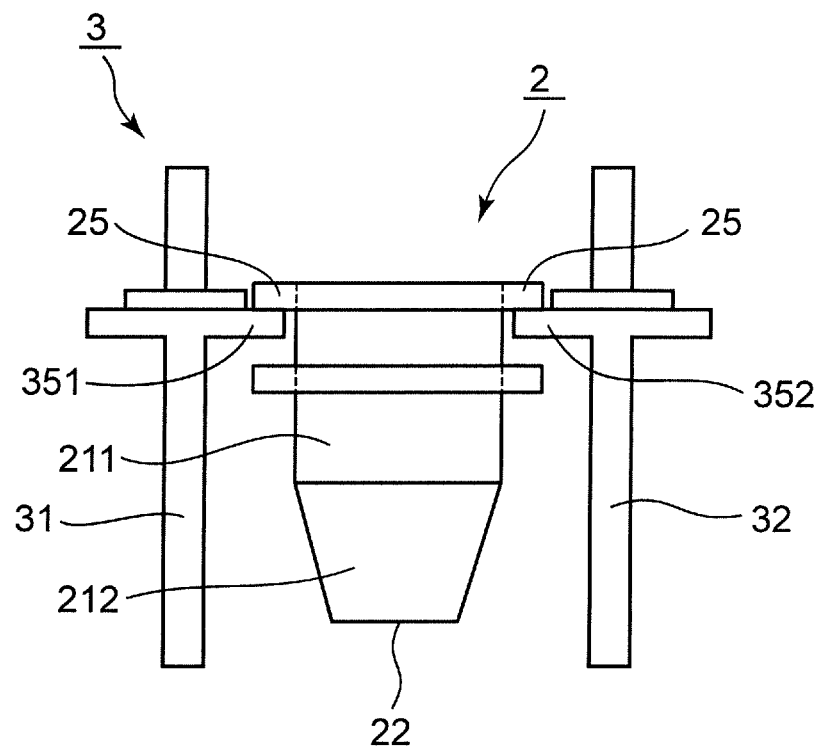
FIG. 14 is a front view showing a state in which a supporting device supports the cell plug in a first supporting position in a case where the first engaging portion and the second engaging portion have protrusions, each being formed to have a protruding shape, and the portion to be engaged has a groove portion formed to have a groove shape.
Figure 15:
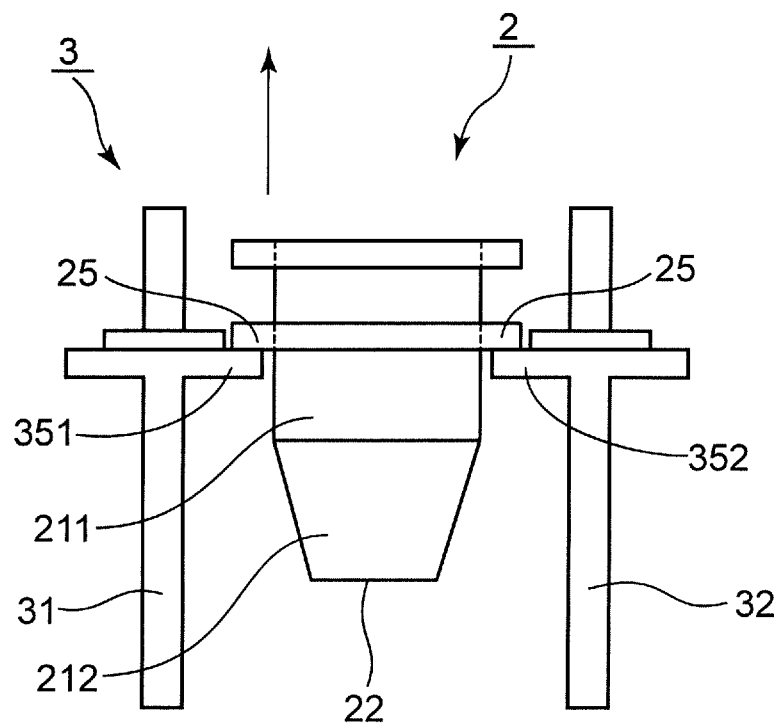
FIG. 15 is a front view showing a state in which the supporting device supports the cell plug in a second supporting position in the same case as FIG. 14.

In the above embodiments, the first engaging portion 311 and the second engaging portion 321 of the supporting device 3 each have a groove shape, and the portion to be engaged 23 of the cell plug 2 has a protruding shape. However, the first engaging portion and the second engaging portion may have a protruding shape, and the portion to be engaged may have a groove shape. FIG. 13 is a schematic perspective view of a cell plug 2 in which a portion to be engaged 25 has a groove shape. FIG. 14 is a front view showing a state in which the supporting device 3 supports the cell plug 2 in the first supporting position in a case where a first engaging portion 351 and the second engaging portion 352 of the supporting device 3 have protrusions, each being formed to have a protruding shape, and the portion to be engaged 25 has a groove portion formed to have a groove shape. FIG. 15 is a front view showing a state in which the supporting device 3 supports the cell plug 2 in the second supporting position in the same case as FIG. 14.

As shown in FIGS. 13 and 14, the first engaging portion 351 is a protrusion extending in the X direction (a direction perpendicular to the plane of the drawing), and the second engaging portion 352 is a protrusion facing the first engaging portion 351 and extending in the X direction. Meanwhile, the portion to be engaged 25 of the cell plug 2 is a groove portion. The supporting device 3 is configured to support the cell plug 2 by engaging the protrusion of the first engaging portion 351 and the protrusion of the second engaging portion 352 with the groove portion of the portion to be engaged 25 of the cell plug 2. Therefore, the cell plug 2 is configured to be slidable in the X direction in a state of being engaged with the first engaging portion 351 and the second engaging portion 352, and also to be detached from the supporting device 3 by sliding outward in the X direction from the ends in the X direction of the first engaging portion 311 and the second engaging portion 321.

As shown in FIGS. 13 and 15, the first engaging portion 351 is a protrusion extending in the X direction, and the second engaging portion 352 is a protrusion facing the first engaging portion 351 and extending in the X direction. Meanwhile, the portion to be engaged 25 of the cell plug 2 is a groove portion. The supporting device 3 is configured to support the cell plug 2 by mounting the lower surface of the groove portion of the portion to be engaged 25 in the cell plug 2 on the protrusion of the first engaging portion 351 and the protrusion of the second engaging portion 352. Therefore, the cell plug 2 is lifted upward from the supporting device 3 and thereby is separated from the protrusion of the first engaging portion 351 and the protrusion of the second engaging portion 352 to thereby be detached from the supporting device 3.

Figure 16:
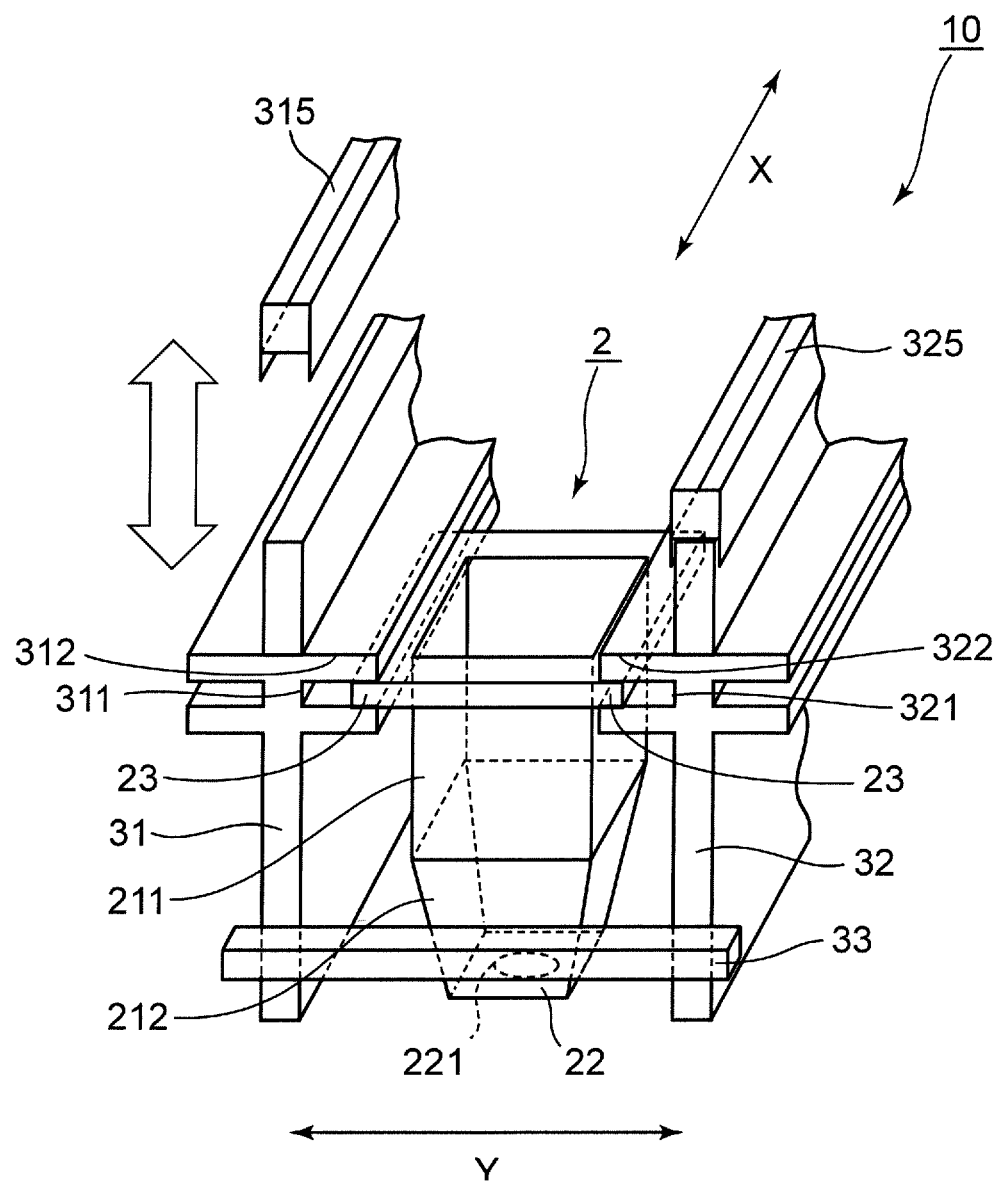
FIG. 16 is a schematic perspective view showing a modification of the seedling raising device in which the first concave portion is configured to be attachable to and detachable from an upper end of a first member, and the second concave portion is configured to be attachable to and detachable from a second member.
Figure 17:
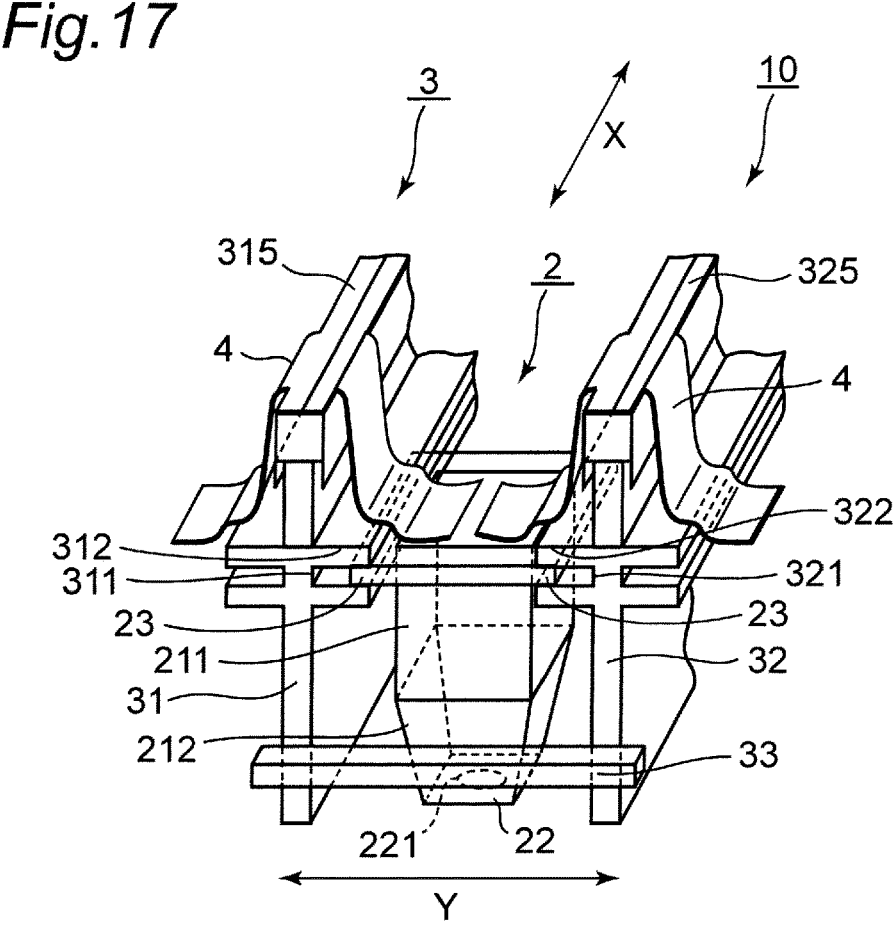
FIG. 17 is a diagram showing a state in which the liquid supply members are provided in the modification shown in FIG. 16, specifically, a schematic perspective view showing a state in which the cell plug is supported in the first supporting position.
Figure 18:
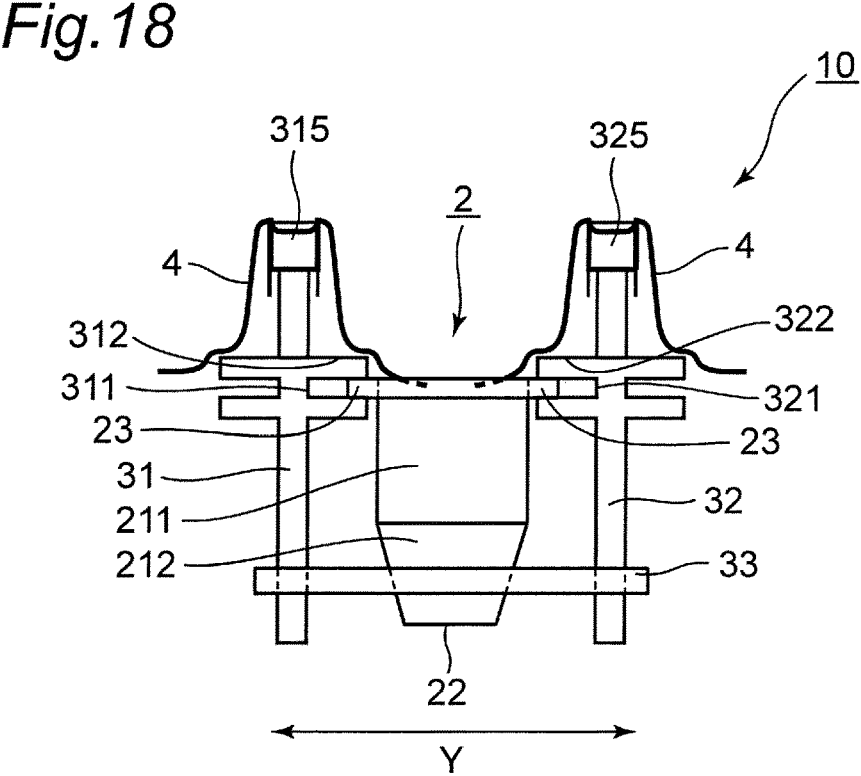
FIG. 18 is a front view of the seedling raising device shown in FIG. 17.
Figure 19:
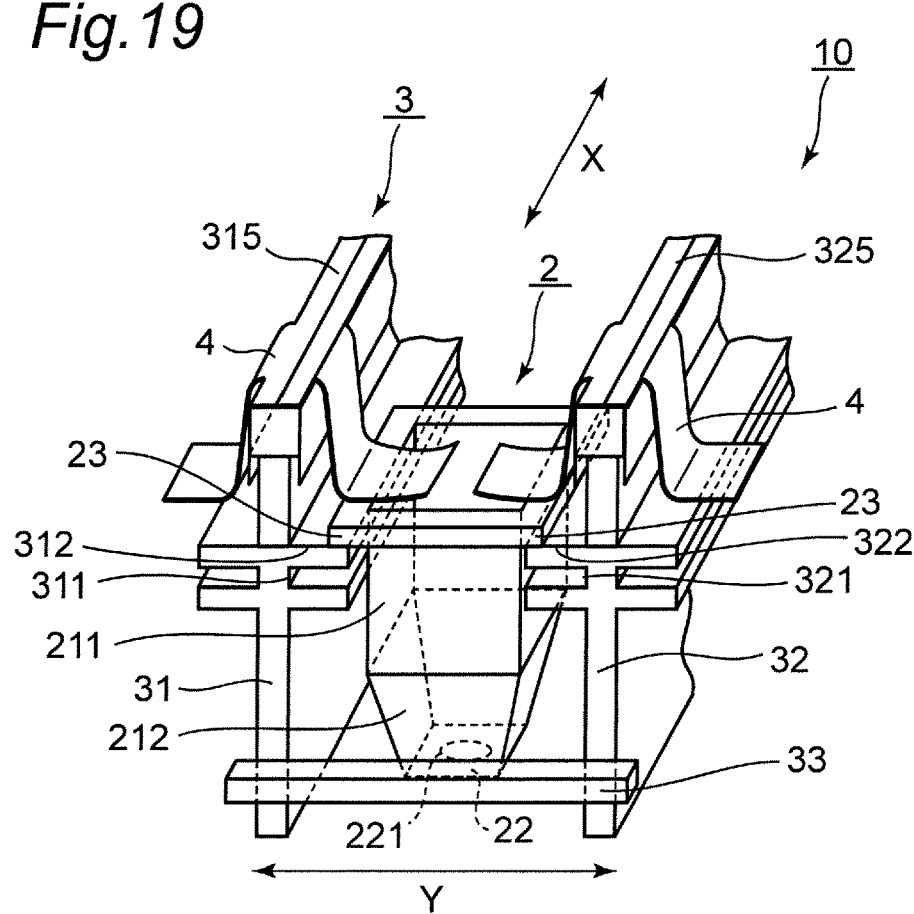
FIG. 19 is a view similar to FIG. 17, specifically, a schematic perspective view showing a state in which the cell plug is supported in the second supporting position.
Figure 20:
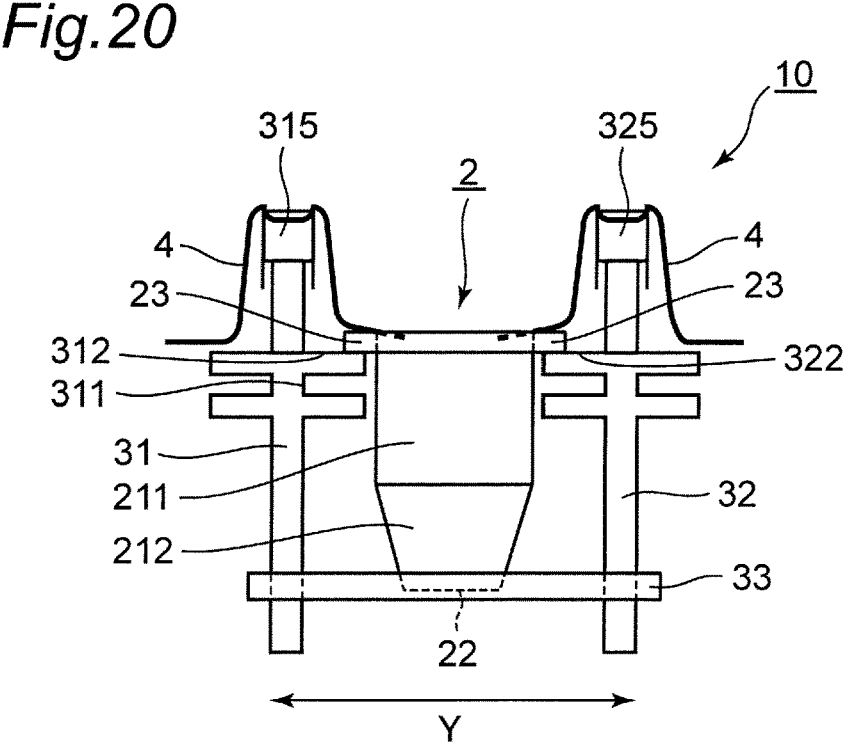
FIG. 20 is a front view of the seedling raising device shown in FIG. 19.

In the above-mentioned embodiment, the first concave portion 313 is formed at the upper end of the first member 31, and the second concave portion 323 is formed at the upper end of the second member 32. Alternatively, as shown in FIG. 16, a first concave portion 315 may be configured to be attachable to and detachable from the upper end of the first member 31, and a second concave portion 325 may be configured to be attachable to and detachable from the second member 32. FIGS. 17 to 20 show a state in which the liquid supply member 4 is provided in the embodiment shown in FIG. 16. FIG. 17 is a perspective view showing a state in which the cell plug 2 is supported in the first supporting position, and FIG. 18 is a front view of the seedling raising device shown in FIG. 17. FIG. 19 is a perspective view showing a state in which the cell plug 2 is supported in the second supporting position, and FIG. 20 is a front view of the seedling raising device shown in FIG. 19.

In the embodiment shown in FIGS. 17 to 20, the first concave portion and the second concave portion can be positioned higher, compared to the case where the first concave portion and the second concave portion are formed in the upper end of the first member and the upper end of the second member, respectively, so that the siphon effect of the liquid supply member 4 can be enhanced. Furthermore, since the first concave portion and the second concave portion are detachable, the first concave portion and the second concave portion can also be attached to the first member and the second member, respectively, after the liquid is supplied to the first concave portion and the second concave portion.

Figure 21:
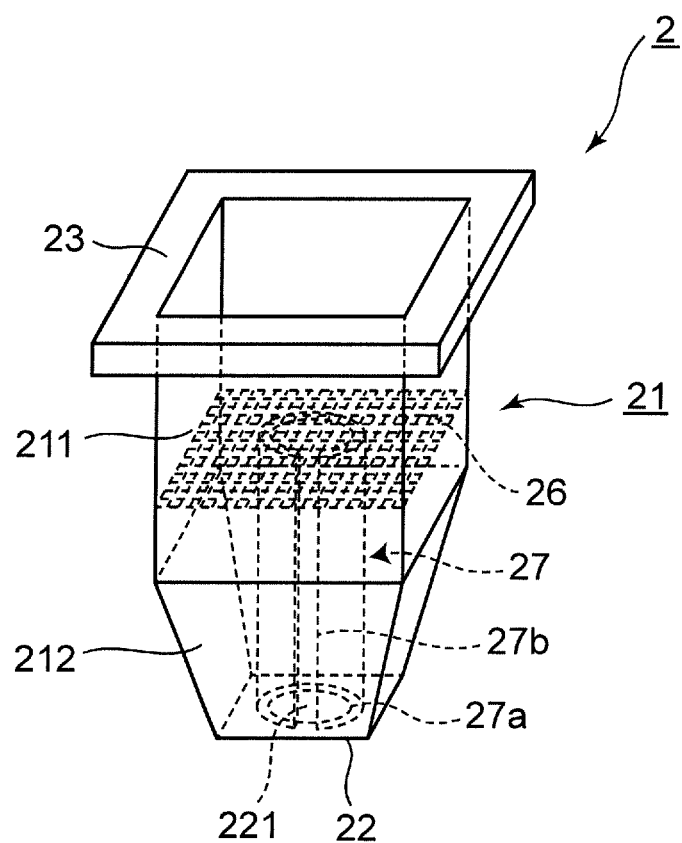
FIG. 21 is a schematic perspective view of a cell plug, specifically, showing a modification of the cell plug mentioned above.

FIG. 21 is a schematic perspective view of a cell plug 2, showing a modification of the cell plug 2 mentioned above. The cell plug 2 includes a partition member 26 that partitions the inside of the cell plug 2 and a supporting member 27 that supports the partition member 26. The partition member 26 is adapted to fit the inner surface of the cell plug 2 and has a plate shape. The partition member 26 is a mesh member that contains a plurality of holes, each hole being smaller than the particle size of the culture soil, and which is made of plastic, paper, or the like. The partition member 26 supports the culture soil in the cell plug 2 from below.

The supporting member 27 supports the partition member 26 from below and has a cylindrical shape having a through hole 26a passing therethrough in the vertical direction. The through hole 27a covers the whole or a part of the through hole 221. The supporting member 27 has a slit 27b formed over the entire area thereof in the vertical direction (axial direction), and is made of plastic, paper, or the like. The supporting member 27 adjusts its length in the vertical direction to thereby change the bottom position of the culture soil in the cell plug 2. The supporting member 27 may have a prismatic shape.

The cell plug 2 has the partition member 26 and the supporting member 27 and adjusts the amount of culture soil in the cell plug 2 by adjusting the length in the vertical direction of the supporting member 27. It is noted that the supporting member 27 has the through hole 27a corresponding to the through hole 221, thus making it possible to prevent the supporting member 27 from interrupting the drainage of water and ventilation of air from the through hole 221 in the bottom wall 22 of the cell plug 2. In addition, since the supporting member 27 has the slit 27b, the drainage of water and ventilation of air from the inside of the supporting member 27 can be promoted.

In the above-mentioned embodiments, the liquid supply member 4 is made of a nonwoven fabric, but may be made of paper, felt, knitted fabric, or the like.

In the above-mentioned embodiments, the cell plug 2 is formed of plastic, and may be formed of biodegradable plastic, paper, or the like. It is noted that when the cell plug is formed of a biodegradable plastic, the seedlings can be transplanted to a planting floor together with the cell plugs without the need to be taken out of the cell plugs. Furthermore, this cell plug can prevent the damage to the seedling, such as root cutting of the seedling, due to taking the seedling from the cell plug.

In the above-mentioned embodiments, the side wall 21 of the cell plug 2 is shaped such that the horizontal cross-sectional shape of the upper portion 211 is constant along the vertical direction, while the horizontal cross-section of the lower portion 212 becomes smaller along the downward direction. That is, the lower portion 212 has a tapered shape that decreases in size downward. However, the side wall of the cell plug as a whole may have a tapered shape whose horizontal cross-section becomes smaller along the downward direction. In the above-mentioned embodiments, the horizontal cross-section of the side wall 21 of the cell plug 2 has a rectangular shape, but is not limited to the rectangular shape and may have a circular shape, an elliptical shape, or any other shape.

Various modifications and changes can also be made to the disclosure herein without departing from the spirit and scope of the present invention as set forth in the appended claims.

INDUSTRIAL APPLICABILITY

The present invention can provide a seedling raising device, and a supporting device and a cell plug for use in the seedling raising device, which can facilitate the collection of cell plugs so as to raise and deliver seedlings and the separation of the cell plugs so as to classify and sort seedlings. Therefore, the present invention is of great utility value in terms of industry.

The invention claimed is:
1. A seedling raising device comprising:
a cell plug for seedling raising that is formed as a single pot body; and
a supporting device configured to detachably arrange and support a plurality of cell plugs, wherein
the supporting device is capable of supporting the cell plug in either one of a first supporting position where the cell plug is slidably supported in a horizontal direction and a second supporting position where the cell plug is detachably supported in a top position, wherein
the supporting device includes a first member and a second member that face each other and is configured to be capable of changing an interval between the first member and the second member,
the first member is provided with a first engaging portion extending in the horizontal direction,
the second member is provided with a second engaging portion facing the first engaging portion and extending in the horizontal direction,
the cell plug is slidable in the horizontal direction while being engaged with the first engaging portion and the second engaging portion,
the first member is provided with a first mounting portion extending in the horizontal direction,
the second member is provided with a second mounting portion facing the first mounting portion and extending in the horizontal direction, and
the cell plug is mounted on the first mounting portion and the second mounting portion and is detachable in the top position, and
wherein a first concave portion recessed downward and extending in the horizontal direction is provided on an upper end of the first member,
a second concave portion recessed downward and extending in the horizontal direction is provided on an upper end of the second member,
the first concave portion and the second concave portion are capable of storing therein a liquid, and the seedling raising device further comprises a liquid supply member capable of supplying the liquid stored in the first concave portion or the second concave portion into the cell plug.

2. The seedling raising device according to claim 1, wherein the supporting device is configured to support the cell plug in either one of the first supporting position and the second supporting position in such a manner as to flexibly set an interval between the cell plugs.

3. The seedling raising device according to claim 1, wherein the first concave portion and the second concave portion are exposed to atmosphere, and
the liquid supply member is made of a lubricating medium and is configured to supply the liquid stored in the first concave portion or the second concave portion into the cell plug using a capillary phenomenon.

4. The seedling raising device according to claim 1, wherein the cell plug comprises a portion to be engaged that is engageable with the first engaging portion and the second engaging portion, and a portion to be mounted that is mountable on the first mounting portion and the second mounting portion, and
the portion to be engaged and the portion to be mounted are configured to protrude laterally outward from a main body of the cell plug.

5. The seedling raising device according to claim 1, wherein the cell plug has a through hole formed in a bottom wall thereof.

6. A supporting device configured to detachably support a cell plug for seedling raising, the cell plug being formed as a single pot body,
the supporting device comprising a first member and a second member that face each other, the supporting device being configured to be capable of changing an interval between the first member and the second member, wherein the first member is provided with a first engaging portion extending in a horizontal direction, the second member is provided with a second engaging portion facing the first engaging portion and extending in the horizontal direction, the first member is further provided with a first mounting portion extending in the horizontal direction, and the second member is further provided with a second mounting portion facing the first mounting portion and extending in the horizontal direction, and wherein a first concave portion recessed downward and extending in the horizontal direction is provided on an upper end of the first member, a second concave portion recessed downward and extending in the horizontal direction is provided on an upper end of the second member, the first concave portion and the second concave portion are capable of storing therein a liquid, and the seedling raising device further comprises a liquid supply member capable of supplying the liquid stored in the first concave portion or the second concave portion into the cell plug.

\* \* \* \* \*